Figure 1:
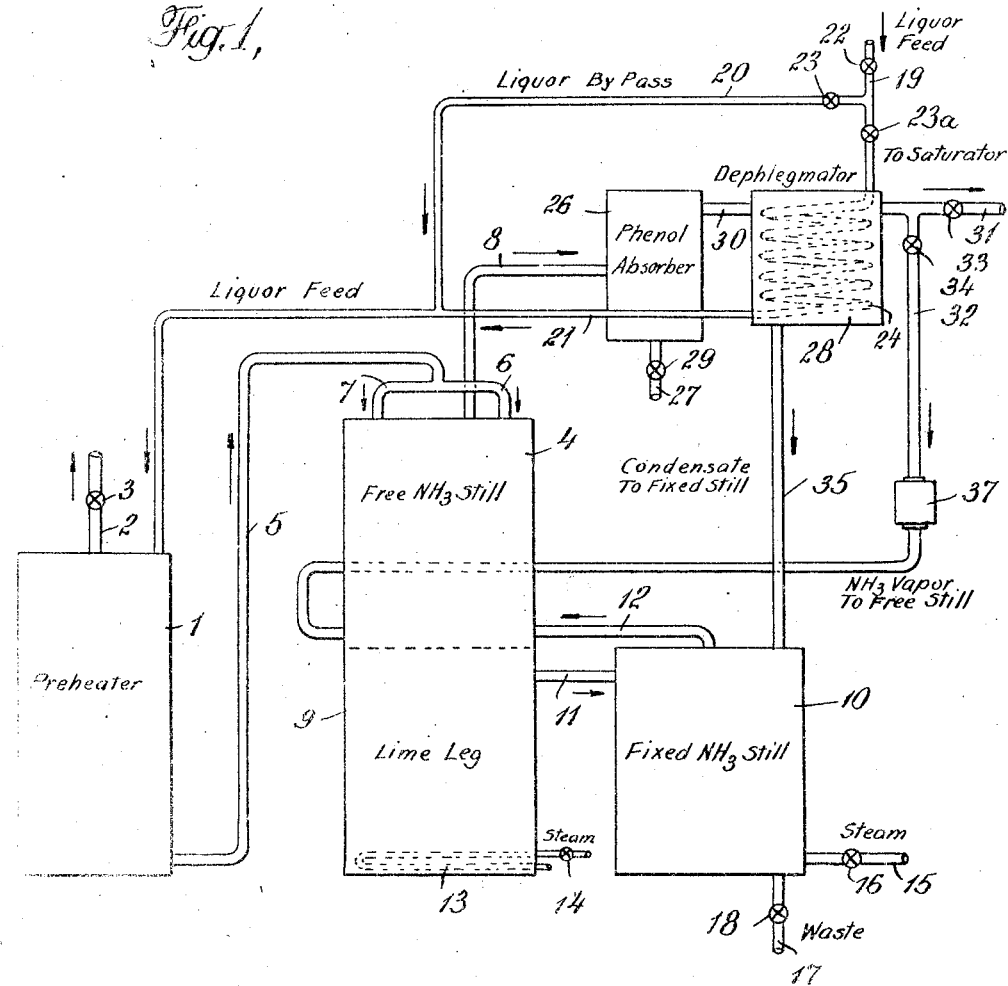

Patented Dec. 22, 1925.

1,566,795

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA.

TREATMENT OF GAS LIQUOR.

Application filed December 16, 1924. Serial No. 756,193.

*To all whom it may concern:*

Be it known that we, LE ROY W. HEFFNER and WILLIAM TIDDY, both citizens of the United States, residing at East Norristown Township, county of Montgomery, State of Pennsylvania, and Jeffersonville, county of Montgomery, State of Pennsylvania, respectively, have invented certain new and useful Improvements in the Treatment of Gas Liquor; and we do hereby declare the following to be a full, clear, and exact description of the invention, such as will enable others skilled in the art to which it appertains to make and use the same.

This invention relates to the treatment of gas liquor and ammoniacal liquor from gas plants or coke ovens whereby the waste liquor from the ammonia stills can be disposed of without the objections incident to present methods of disposal. The process of the invention, in its broader aspects, is also applicable for the separation and recovery of phenols from other waste liquors, containing the phenols in small amounts.

After the treatment of gas liquor, for the recovery of ammonia therefrom, the waste liquor from the ammonia stills contains impurities, particularly those of a phenolic character, which, even though present in relatively minute amounts, are objectionable in streams or other bodies of water from which drinking water is obtained, particularly if the drinking water is subjected to a chlorination treatment. These objections to still waste liquor are well recognized, with the result that the discharge of such liquor into streams or other bodies of water is in many cases prohibited, and special means or provisions are necessary for the treatment or disposal of this waste liquor, such as the pumping of the liquor to special collection or treatment basins or to waste land where it is not a source of contamination to city water supplies. Waste liquors from other sources, such as those from the manufacture of phenolic resins or condensation products, are similarly objectionable.

Numerous attempts and proposals have been made to treat still waste liquor to free it from its objectionable impurities, but these methods, so far as we are aware, have been only partially successful, and have not brought about a sufficient purification of the waste liquor.

As distinguished from such prior proposals to treat the waste liquor, the present invention relates to an improved method of treating the gas liquor in connection with the removal of ammonia therefrom, so that the waste liquor is directly obtained in a state sufficiently free from objectionable impurities to permit it, after the usual dilution, to be discharged directly into streams without the resulting objections incident to the similar discharge of present day waste liquor.

In the customary methods of treating gas liquor from coke oven plants or from gas plants for the distillation of ammonia therefrom, the gas liquor is fed without preheating into the ammonia still, in the first or free ammonia section of which the free ammonia is largely driven off, after which the liquor is mixed with lime and heated by steam to set free the combined ammonia which passes into the free ammonia section of the still and is driven off along with the free ammonia from this section. In aqua ammonia and concentrated ammonia liquor plants, where the liquor is preheated to drive off hydrogen sulfid and carbon dioxide before it is fed into the ammonia still, dephlegmators are provided to cool the ammonia vapors and to separate water vapor therefrom in order to reduce the burden on the condensers and absorbers and to avoid dilution, the ammonia driven off from the free ammonia section of the still being passed through the dephlegmator and the temperature of the liquor in the still and in the dephlegmator being maintained sufficiently low so that the ammonia gas will be driven off in a relatively concentrated state, free from any large amount of water vapor.

In our investigation of the operation of such ammonia stills, we have observed that the phenols tend to be combined with and driven off with the ammonia but are prevented from being so driven off by the low temperature of the liquor with which the ammoniacal vapors come in contact, with the result that the phenols are held in the still and pass down into the fixed ammonia still where they are combined with the lime and kept from removal by volatilization.

We have found, however, that if the temperature of the liquor in the still is maintained sufficiently high, e. g., between 98 and 100° C. or higher, and if a sufficient amount of ammonia is present and is driven off, substantially all of the phenol can be driven off with the ammonia and thereby prevented from being carried down into contact with the lime and from being fixed and held in the fixed ammonia still as calcium phenolate.

In carrying out the present invention, accordingly, we treat the gas liquor before or during its passage through the preheating and free ammonia sections of the ammonia still, by maintaining a sufficiently high temperature and by providing a sufficient amount of ammonia, so that substantially all of the phenol is volatilized and carried off with the ammonia and thereby removed from the still, with the result that the waste liquor from the still is free or substantially free from objectionable phenolic constituents. By proceeding in this way, no opportunity is provided for the phenols to come into contact with the lime, so that the lime has no opportunity of combining with the phenols and of retaining them in the liquor.

The improved process of the present invention, in its broader aspects, can be carried out in present day ammonia stills, provided the liquor in the still is capable of being maintained at a sufficiently high temperature above 98° C. Where such stills are provided with dephlegmators, the dephlegmator should not be cooled to a low temperature, but should be kept at a sufficiently high temperature so that the vapors are not cooled below 98° C., and preheaters or other heating means, such as steam coils, should be provided for maintaining the temperature of the liquor at the inlet of the still sufficiently high to insure the volatilization and escape of the phenols or of the phenolates. Our investigations indicate that the phenols are combined, largely if not entirely, as ammonium phenolates, which are more volatile than the phenols themselves, and which are readily removed when a sufficient amount of ammonia is passed through the hot solution and when the liquor is maintained at a sufficiently high temperature.

We have, however, provided an improved apparatus, specially adapted for carrying out the process of the invention, and the process can be carried out with particular advantage in such apparatus, although the process, in its broader aspects, is not limited to any apparatus.

In order to insure that the phenol is substantially all driven off with the ammonia, we have found it necessary to provide or insure a sufficient amount of ammonia, usually in excess of that normally present in the liquor. In the case of gas liquors particularly rich in ammonia, the ammonia content of the liquor may itself be sufficient to insure driving off the phenols in accordance with the present invention; but where the gas liquors do not themselves contain a sufficient amount of ammonia, we have found it necessary to provide additional ammonia to assist in driving out the phenols.

We have found that the added ammonia required for the purpose may advantageously be a part of that given off from the ammonia still itself. This ammonia, however, carries the phenols with it, and its direct return to the still would reintroduce the phenols or phenolates. To avoid this, we subject the ammonia coming off from the still to a purification treatment to free it from the phenols or phenolates which it carries, and we obtain in this way an ammonia sufficiently free to permit its return to the still to increase the ammonia content in the free ammonia portion of the still. The ammonia given off from the still, in the process of the present invention, also carries with it a much larger content of steam or water vapor than the ammonia normally escaping from ammonia stills. We find that the ammonia, after purification from phenols, can advantageously be subjected to a dephlegmating action and a considerable amount of the water vapor condensed therefrom together with some of the ammonia. This ammoniacal water can advantageously be returned to the still to increase the ammonia content of the liquor therein, and to correspondingly increase the ammonia passing upwardly through the free ammonia section of the still. Where the amount of ammonia returned in this way as ammoniacal liquor is not sufficient, further amounts of ammonia gas can be returned to the still to insure enough ammonia to complete the driving off the phenols or phenolates from the still.

Instead of obtaining the ammonia from the stills themselves, in the manner just mentioned, ammonia from another source may, if available, be used to increase the ammonia content of the liquor in the still, and the ammonia escaping from the still itself may be purified and employed, for example, for the production of aqua-ammonia or of ammonium sulphate. We consider it more advantageous, however, to utilize the ammonia, or a part of the ammonia, given off from the still itself, after purification to free it from the phenols or phenolates with which it is admixed.

Where the amount of phenol in the gas liquor is small, the amount may not be of sufficient value to warrant its recovery, although the amount may be sufficient so that, if not removed, the waste liquor would be objectionable. In such cases, we may purify the ammonia and free it from the small amounts of phenol without recovering the phenol, thereby obtaining the ammonia in a purified state for absorption or for use in the process.

We find, however, that the amount of phenol contained in gas liquor is often sufficiently high to make its recovery profitable; and we find that the improved process of the present invention enables the phenols to be recovered in a simple and advantageous manner, and as a by-product, so to speak, of the main process of purification of the gas liquor.

The separation of the phenol from the ammonia can be effected in different ways, for example, by passing the combined vapors from the ammonia still through a washer containing lime, caustic soda, absorbent carbon, or other suitable absorbent medium for the removal of the phenols and tarry acids. The absorbent containing the phenols and tarry acids combined therewith may, if the recovery of the phenols and tarry acids is not to be effected, be disposed of in any suitable way. Where the phenol is to be recovered, the absorbent medium should be of a character which will permit the absorbed or combined phenol to be subsequently separated therefrom. For example, by using caustic soda, sodium phenolate, etc., will be formed, and the phenol can be subsequently recovered from the sodium phenolate solution by acidification and distillation.

In applying the phenol separation and recovery in combination with the treatment of the gas liquor, in the process of the present invention, the ammonia and admixed vapors from the ammonia still can be passed through a washer containing a solution of caustic soda kept at a sufficiently high temperature to prevent dilution from the water vapor condensing from the combined vapors. By passing the gases through such a washer and then through a condenser or dephlegmator, the phenols and tarry acids can be effectively absorbed and a concentrated solution of phenolate obtained, and the water vapor can be separately and subsequently separated from the ammonia gas by cooling, leaving the ammonia gas free from excess moisture, for subsequent absorption; while the separated ammoniacal water can advantageously be returned to the still, as above mentioned. As soon as the caustic soda contains the required amount of sodium phenolate, it is removed and phenol and tarry acids recovered, for example, by acidification and distillation, or by other recovery process. The phenolate may, for example, be treated with carbon dioxide, or other acid or nitrecake, with resulting separation of the oils, which may be recovered by steam distillation, using indirect steam distillation in a vacuum still, and with a condenser constructed of suitable material to prevent undue deterioration.

The invention will be further described in connection with the accompanying drawings which illustrate an apparatus adapted for the practice of the process of the invention. In the drawings, Fig. 1 shows a somewhat diagrammatical form and arrangement of the apparatus and Fig. 2 shows on a somewhat enlarged scale one form of the ammonia still itself.

Figure 2:
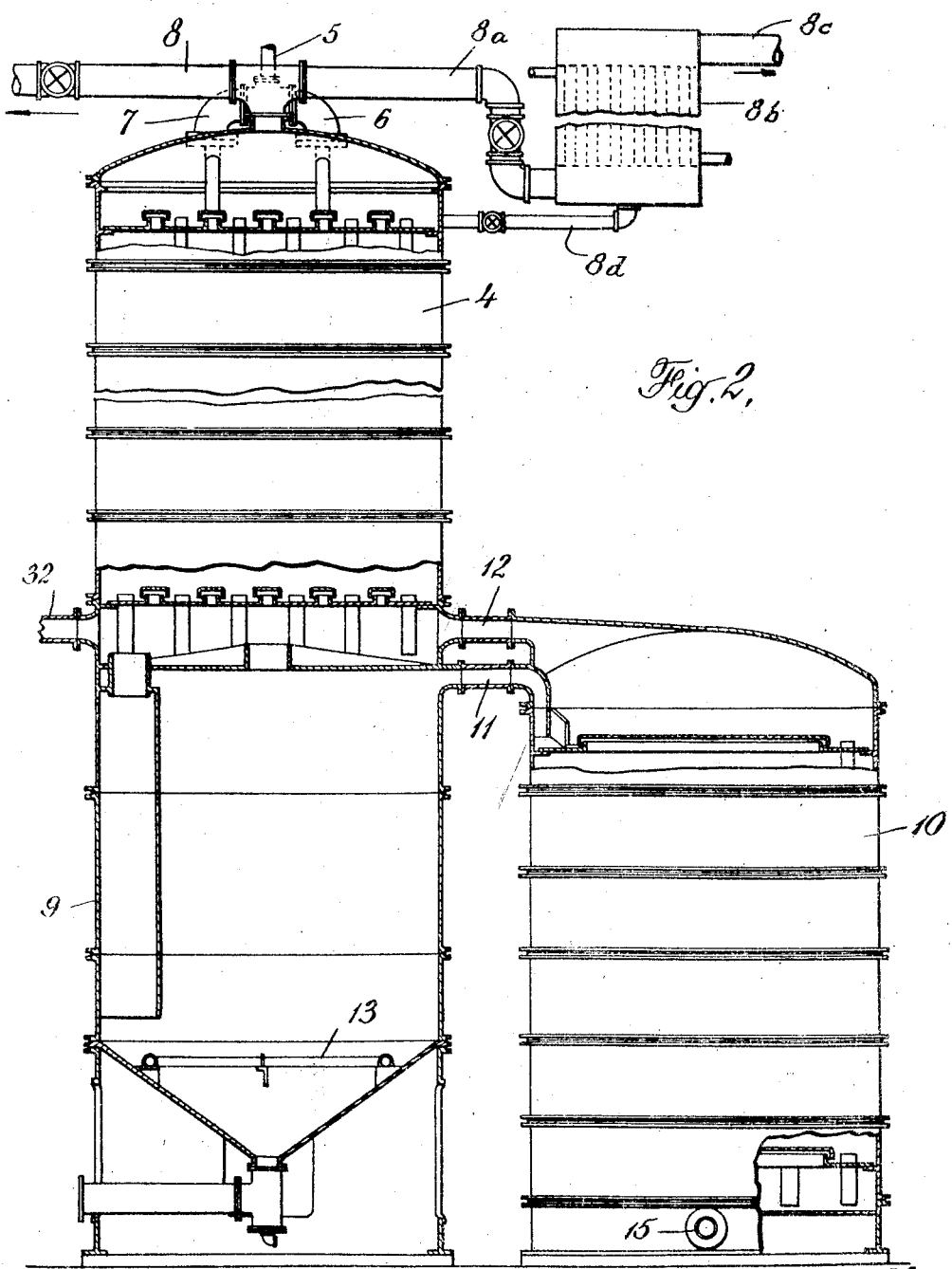

Referring first to Fig. 1, it will be seen that the apparatus includes the preheater 1 for the gas liquor with a release pipe 2 having valve 3 therein, and with an outlet pipe 5 for conveying the gas liquor to the top of the free ammonia still 4 into which it enters through the branch pipes 6 and 7. The vapor or ammonia outlet pipe from the free ammonia still is indicated at 8. The still has the usual lime leg 9 which is connected with the fixed ammonia still 10 through the pipe 11. The ammonia gas from the fixed ammonia still passes through the pipe 12 to the free ammonia still in the usual way. The lime leg is provided with a heating coil 13 having steam regulating valve 14; while the fixed ammonia still has a steam supply pipe 15 with controlling valve 16 therein. The waste liquor from the fixed ammonia still is drawn off through the pipe 17 having control valve 18 therein. The apparatus thus far described may be the same as the ordinary ammonia still, or the still may be modified, e. g., as illustrated in Fig. 2.

The supply of gas liquor enters through the pipe 19 and through one or the other or both of the branch pipes 20 and 21 to the preheater. Suitable regulating valves 22, 23, and 23ª are provided. The branch pipe 21 has a coil 24 arranged in the dephlegmator 28 to cool the gases passing therethrough, the liquor being itself somewhat heated in this way.

The vapors from the ammonia still enter the phenol absorber 26 which may be of any suitable construction to bring the gases into intimate contact with the absorbent. For example, an alkali solution may be provided in this washer. The washer has an outlet pipe 27 with control valve 29 therein for drawing off the alkali phenolate solution. The ammonia gas after purification passes through the pipe 30 to the dephlegmator 28 where the gases are cooled and water vapor is largely separated. The ammoniacal liquor thus condensed may be returned through the pipe 35 to the fixed ammonia still 10.

After passing through the dephlegmator 28, the ammonia gas, freed from a considerable portion of its admixed water vapor, passes through the pipe 31, having valve 33 therein, to the saturator or absorber. A part of this gas may be returned through the pipe 32, having valve 34 therein, to the bottom of the free ammonia still, a suitable pump 37 being provided for forcing this ammonia into the free ammonia still.

One suitable form of ammonia still is illustrated more in detail in Fig. 2, the general features of this still being indicated by the same reference characters used in Fig. 1. The free ammonia still 4 and the fixed ammonia still 10 are made up of suitable baffle arrangements for insuring that the ammonia will be progressively driven off from the liquor. The free ammonia driven off from the fixed ammonia still passes through the pipe 12 into the lower part of the free ammonia still and passes upwardly countercurrent to the hot liquor flowing downwardly through this portion of the still. By introducing additional ammonia through the pipe 22, the amount of ammonia passing upwardly through this still can be increased sufficiently to insure that all or substantially all of the phenols and tar acids are driven off when the proper temperature is maintained. The gas liquor from the bottom of the free ammonia still passes down through the lime leg where the reaction with lime takes place, and the liquor then flows to the fixed ammonia still where the ammonia set free is driven off.

It will be noted that the upper or free ammonia section of the still of Fig. 2 is broken away to indicate a still of indefinite height. Instead of being of usual height, additional sections may be provided to give an increased opportunity for the preheated gas liquor to come into contact with the ammonia vapors. The upper portion of the free ammonia still becomes a countercurrent scrubber, and, by maintaining the gas liquor at a sufficiently high temperature, above 98° C., removal of a considerable portion of the ammonia and phenolate will take place before the liquor reaches the lower portion of the free ammonia still, while the added ammonia from the fixed ammonia still, or recycled after purification to the bottom of the free ammonia still, will complete the driving off of the phenolic compounds as phenolates.

In Fig. 2, two outlet pipes, 8 and 8ª, are indicated for the ammoniacal vapors escaping from the still. The outlet pipe 8 permits all of the vapors from the still to pass to the phenol absorber, as illustrated in the arrangement of Fig. 1. The outlet pipe 8ª is connected with a dephlegmator by means of which the temperature of the ammoniacal vapors can be somewhat reduced before these vapors pass to the phenol absorber. In the operation of the ammonia still, the temperature may be maintained considerably above 98° C. and even above 103° C. Particularly at the latter and higher temperatures, a large amount of water vapor comes off with the ammonia. By cooling the vapors to a temperature below 103° C., i. e., between 103° C. and 98° C., a considerable portion of the excess water vapor can be condensed from the vapors before they pass to the phenol absorber. In the apparatus of Fig. 2, the outlet pipe 8ª leads to a reflux cooler or dephlegmator 8ᵇ, from which the cooled vapors escape at 8ᶜ and the reflux condensate is returned to the ammonia still through the pipe 8ᵈ. Suitable valves in the pipes 8, 8ª and 8ᵈ permit controlling the flow of vapors so that they pass either through the outlet pipe 8 or through the outlet pipe 8ª and dephlegmator. The dephlegmator may be cooled by water which is regulated in amount and temperature so that the vapors are not cooled below 98° C., thereby preventing recondensation or reabsorption of phenolate.

In the operation of the process, in the apparatus illustrated, the ammonia stills may be operated in much the usual way, but with a higher temperature in the free ammonia still and particularly at its outlet, and also ammonia is introduced if necessary into the free ammonia still in sufficient amount to insure that all or substantially all of the phenols are removed with the ammonia.

The admixed vapors from the ammonia still pass to the purifier or phenol absorber, where the ammonium phenolates are decomposed, e. g. by caustic soda, and sodium phenolates formed. The ammonia and admixed water vapor then pass to the cooler or dephlegmator 28 where water vapor and some of the ammonia are condensed and the ammonia then escapes to the saturator or may be in part recycled through the pipe 32 to the free ammonia still. The condensate from the condenser or dephlegmator 28 is returned through the pipe 35 to the fixed ammonia still.

The gas liquor is preheated to 98° C. or above before entering the ammonia still to assist in preventing reabsorption of phenolate vapors when passing through the still. The liquor passing through the free ammonia still is also kept at a temperature of at least 98° C. and preferably somewhat higher, and it is brought into contact with ammonia vapors of sufficient volume to react with the phenols, forming ammonium phenolates, which we have found to be more readily volatile than the phenols themselves, and which are not reabsorbed when the temperature of the liquor is about 98° C. and when a sufficient amount of ammonia is present. The recycling of ammonia, made possible by the apparatus illustrated, enables any desired amount of the ammonia to be recycled, so that the presence of sufficient ammonia can be insured for securing complete or substantially complete driving off of the phenols as phenolates. The purification of the ammonia escaping from the still makes possible its return and enables the phenols to be recovered from it as one of the products of the process. It will be noted that the the ammonia recycled through the free ammonia still is in the form of purified and partially dried vapors; while the ammoniacal liquor formed as a condensate in the condenser or dephlegmator 28 passes to the fixed ammonia section where the ammonia is evolved and passed into the bottom of the free section.

In the operation of the apparatus of Fig. 2, the temperature may be maintained in part by preheating the gas liquor to a temperature of 98°. C. or higher, and in part by the reflux condenser or dephlegmator $8^b$, where this dephlegmator is used. The temperature of the liquor in the still including the liquor at the top or liquor inlet portion of the still, is maintained above 98° C. and may be several degrees higher than that temperature. If the temperature of the escaping vapors is too high, so that their water vapor content is excessive, they may be cooled in the dephlegmator $8^b$ and a considerable portion of the water vapor removed therefrom before they pass to the phenol absorber.

The process of the present invention enables as much as 99.5% or more of the phenols originally present in the gas liquor to be removed therefrom with the ammonia, so that the waste liquor flowing from the ammonia still contains such insignificant traces of phenol that, when diluted, they are unobjectionable and can be discharged into water courses. In some cases, it may not be necessary to effect complete removal of the phenols from the gas liquors; but the process of the present invention enables such removal to be effected with substantial completeness, or with a sufficient approximation to completeness to remove the nuisance from the waste liquor from the still. For example, the removal of around 98 to 99% of the phenols present in the liquor can readily be effected.

As an example of the application of the process, a gas liquor containing as high as 2.3 grams of phenols per liter was treated with maintenance of the liquor at a temperature of about 99.5° C. and an amount of ammonia was added in the form of concentrated ammonia solution equal to that of gas liquor treated. The waste liquor contained only 0.0203 gram of phenol per liter, corresponding to a removal of 99.5% of the phenols present in the gas liquor. In a similar run using about two-thirds as much ammonia, a removal of 98.2% of the phenols present in the gas liquor was effected.

It will thus be seen that the present invention provides a new and improved method of treating gas liquor, in which the treatment of the liquor brings about the removal of phenols, etc., and in which this treatment and removal takes place before or after or during the passage of the liquor through the ammonia still. It will also be seen that the process prevents the phenols from coming in contact with the lime which would otherwise combine with them and hold them so that they would contaminate the waste liquor. The present method is therefore of a different character from methods of treating the waste liquor itself for the removal or partial removal of its phenolic content.

The present process moreover enables substantially complete removal of the objectionable phenolic constituents to be effected, elimination of up to 98 or 99% or more being easily accomplished; whereas with the best methods of treating the residual liquor itself, a removal of about 80% of the phenols is approximately the highest efficiency obtainable in so far as we are aware by any method which did not involve an unreasonable expense for equipment or operation; and such a removal of 80% is not sufficiently high to allow the treated still waste to be diverted into rivers without resulting complaints from neighboring consumers.

It will further be seen that the present invention can be carried out in apparatus such as that which is now used for ammonia stills with only such modification as may be needed for insuring the maintenance of a sufficiently high temperature of the liquor in the still and at its outlet, and with the added equipment necessary for providing an added supply of ammonia, which may advantageously be a part of that obtained from the still itself, after suitable purification.

The waste liquor from the process of the present invention may still have the same color of the gas liquor introduced to the still. When the waste liquor from the still is diluted with clear liquor such as is usually available as waste water from gas plants or coke oven plants, the color of the combined water is usually unobjectionable. The waste liquor should of course be thoroughly settled to remove the lime, sludge, etc., for example, by means of settling tanks or thickeners. If further decolorization of the liquor is desirable, this can be effected by a decolorizing treatment, for example, by treatment of the liquor with flue gases.

It will be evident that where the gas liquor contains a considerable amount of phenol, the present invention enables it to be recovered as a valuable product of the process. From the standpoint of phenol recovery, it may not be of importance to effect complete removal of phenol from the liquor to an extent that will make the liquor unobjectionable; but it is one advantage of the process and apparatus of the present invention that with the recycling of a sufficient amount of ammonia and with the maintenance of the proper temperature in the free ammonia still, substantially all of the phenol can be removed from the liquor and recovered as a product of the process.

The process of the present invention requires a relatively small outlay for added plant equipment, and but little added attention on the part of the operator. It is therefore well adapted for use in conjunction with present day ammonia stills; and it enables such stills to be operated with the overcoming of the present day objectionable character of the waste liquor and with the additional recovery, where it is desired, of phenol as a product of this process. Where waste liquor now produced cannot be discharged into streams, because of its polluting effect, and where it requires special disposal, as by pumping a considerable distance, the present process results in a waste liquor sufficiently pure to permit it to be discharged into streams, with the avoidance of such nuisance.

While we have described the invention more particularly for the treatment of gas liquor, and while the invention is of special value for such treatment, and enables the present nuisance of still waste liquors to be overcome, the process is applicable for the treatment of other waste liquors, and particularly liquors from processes in which phenol is employed, and which contain phenol in small amounts. The process can thus be employed to advantage for the recovery of phenol present in small amounts in waste liquors from the manufacture of phenolic resins or condensation products.

In the treatment of waste liquors which do not contain ammonia, but which contain phenols, the liquor is heated to a temperature of 98° C. or higher and sufficient ammonia is supplied thereto to combine with the phenols to form volatile phenolates and to supply a sufficient amount of ammonia in addition to carry away the phenolates therewith. While the ammonia may be obtained from any available source and added to the phenol-containing liquors, the process, when once started, may be made self-contained by recovering and re-using the ammonia over and over, supplying only such added amounts as will make up for loss in the process. The ammonia may thus be added to the phenol-containing liquor and the liquor preheated and subjected to distillation, or the liquor may be first preheated and then introduced into a still and there brought into contact with the ammonia. In a cyclic process of operation, for example, in an apparatus such as that illustrated in Fig. 1, the ammonia may be recycled repeatedly, with purification to separate phenolic compounds therefrom in the manner hereinbefore described. The same ammonia may thus be used continuously in the process with continuous purification and recycling of the purified ammonia. By maintaining a sufficiently high temperature, i. e. above 98° C., and by recycling a sufficient amount of ammonia, substantially complete recovery of phenol can be obtained. Where waste liquors contain small but important percentages of phenol, such that the phenol is difficult to recover by other methods, the process of the present invention enables the phenol to be recovered with substantial completion. The phenols are, moreover, recovered at relatively small expense, the main elements of expense, other than cost of equipment, being the heat required for heating the liquor, the cost of alkali for absorbing the phenol, and the attention of the operator in operating the apparatus. Inasmuch as the waste liquor from the process leaves the still at a high temperature, this liquor may be employed to preheat the liquor supply to the apparatus, through suitable countercurrent heat interchangers, and the cost of heating thereby reduced. In addition to the value of the phenol recovered from waste liquors in this way, the process has the important advantage of freeing the waste liquor from phenolic compounds to such an extent as to permit it to be discharged into streams with the avoidance of nuisance.

We claim:

1. The process of recovering phenols from liquors containing the same in small amounts, which comprises subjecting the liquor to a temperature of 98° C. or higher, in the presence of sufficient ammonia to drive off the phenol as phenolate.

2. The process of recovering phenols from liquors containing the same in small amounts, which comprises preheating the liquor to a temperature of about 98° C. or higher, introducing the preheated liquor into a still, and, causing it to pass therethrough countercurrent to ammonia vapors, the temperature of the liquor being maintained at 98° C. or higher.

3. The process of recovering phenols from liquors containing the same in small amounts, which comprises preheating the liquor to a temperature of about 98° C. or higher, and passing the preheated liquor through a scrubber countercurrent to a current of ammonia vapors, the temperature of the liquor being maintained at 98° C. or higher.

4. The process of recovering phenols from liquors containing the same in small amounts, which comprises preheating the liquor to a temperature of about 98° C. or higher, and subjecting the preheated liquor to the action of ammonia while maintaining the liquor at a temperature of 98° C. or higher, whereby the phenols are converted into ammonium phenolate and removed in vapor form with the ammonia.

5. The process of recovering phenols from liquors containing the same in small amounts, which comprises subjecting the liquor to a temperature of 98° C. or higher, in the presence of sufficient ammonia to drive off the phenol as phenolate, separating the phenolate from the ammonia and returning the ammonia for further use in the treatment of the liquor.

6. The process of recovering phenols from liquors containing the same in small amounts, which comprises subjecting such liquor to distillation with ammonia at a temperature of 98° C. or higher, the ammonia being present in sufficient amount to combine with the phenol and carry off the resulting phenolate in vapor form, separating the phenolate from the ammonia and returning the ammonia to the still.

7. The process of recovering phenols from liquors containing the same in small amounts, which comprises preheating the liquor to a temperature of about 98° C. or higher, introducing the preheated liquor into a still, and causing it to pass therethrough countercurrent to ammonia vapors, the temperature of the liquor being maintained at 98° C. or higher, separating phenolic compounds from the ammonia and returning the ammonia for further circulation countercurrent to the liquor.

8. The process of recovering phenols from liquors containing the same in small amounts, which comprises subjecting the liquor to a temperature of 98° C. or higher, in the presence of sufficient ammonia to drive off the phenol as phenolate, treating the resulting vapors of ammonia and ammonium phenolate with caustic alkali to form alkali phenolate and to set free the ammonia from the ammonia phenolate.

9. The process of recovering phenols from liquors containing the same in small amounts, which comprises subjecting such liquor to distillation with ammonia at a temperature of 98° C. or higher, the ammonia being present in sufficient amount to combine with the phenol and carry off the resulting phenolate in vapor form, treating the resulting vapors of ammonia and ammonium phenolate with caustic alkali to form alkali phenolate and to set free the ammonia from the ammonium phenolate, and returning the ammonia for the treatment of further amounts of liquor.

10. The process of treating gas liquor containing phenolic impurities which comprises subjecting the same to distillation for the recovery of ammonia therefrom, and maintaining the temperature of the liquor at 98° C. or higher, in the presence of a sufficient amount of ammonia to volatilize and remove substantially all of the phenol with the ammonia.

11. The process of treating gas liquor containing phenolic impurities which comprises subjecting the same to distillation in a free ammonia still for the removal of free ammonia therefrom, then setting free the fixed ammonia and passing it through the free ammonia still, passing additional ammonia through the free ammonia still, and maintaining the temperature of the liquor at the top of the free ammonia still at about 98° C. or higher, whereby phenol is driven off from the free ammonia still as phenolate with the ammonia.

12. The process of treating gas liquor containing phenolic impurities which comprises subjecting the same to distillation in a free ammonia still for the removal of free ammonia therefrom, then setting free the fixed ammonia and passing it through the free ammonia still, and maintaining the temperature of the liquor in the free ammonia still at about 98° C. or higher, whereby phenol is driven off from the free ammonia still as phenolate with the ammonia, sufficient ammonia being introduced into the free ammonia still to insure substantially complete volatilization of the phenol with the ammonia.

13. The process of treating gas liquor containing phenolic impurities which comprises pre-heating the liquor, introducing the preheated liquor into a free ammonia still and subjecting the same to distillation therein, the liquor in the free ammonia still being maintained at a temperature in excess of about 98° C. and a sufficient amount of ammonia being present therein to effect removal of substantially all of the phenol as phenolate with the ammonia, and separating the phenolate from the ammonia.

14. The process of treating gas liquor containing phenolic impurities which comprises pre-heating the liquor, introducing the preheated liquor into an ammonia still, the liquor in the upper portion of which is maintained at a temperature of 98° C. or higher, and subjecting the liquor therein to the action of sufficient ammonia to remove substantially all of the phenol as phenolate with the ammonia, and separating the phenolate from the ammonia.

15. The process of treating gas liquor containing phenolic impurities which comprises subjecting the same to distillation with maintenance of the liquor at a temperature in excess of about 98° C. and in the presence of a sufficient amount of ammonia to remove phenolic compounds with the ammonia, and freeing the ammonia from phenolic compounds by passing the admixed gases through an absorbent for the phenolic compounds.

16. The process of treating gas liquor containing phenolic impurities which comprises subjecting the same to distillation in an ammonia still for the recovery of ammonia therefrom, the temperature of both the liquor and the escaping vapors and gases from the ammonia still being in excess of about 98° C. to drive off phenolic compounds with the ammonia, treating the admixed vapors and gases to separate phenolic compounds therefrom, and returning a part of the resulting purified ammonia to the ammonia still.

17. The process of treating gas liquor containing phenolic impurities which comprises subjecting the same to distillation in an ammonia still for the recovery of ammonia therefrom, the temperature of both the liquor and the escaping vapors and gases from the ammonia still being in excess of about 98° C. to drive off phenolic compounds with the ammonia, treating the admixed vapors and gases to separate phenolic compounds therefrom, and returning a part of the resulting purified ammonia to the ammonia still, the amount of ammonia so returned being sufficient to insure substantially complete removal of phenolic compounds from the still with the ammonia.

18. The process of treating gas liquor containing phenolic impurities which comprises pre-heating the same, introducing the pre-heated liquor into an ammonia still, the liquor in the upper portion of which is maintained at a temperature in excess of about 98° C. to effect removal of phenolic compounds with the ammonia, separating the phenolic compounds from the ammonia, and returning a portion of the resulting purified ammonia to the ammonia still, the amount of ammonia so returned being sufficient with that present in the still to insure the substantially complete removal of the phenolic compounds.

19. The process of treating gas liquor containing phenolic impurities which comprises pre-heating the liquor, introducing the pre-heated liquor into a free ammonia still, the liquor in the upper portion of which is maintained at a temperature in excess of about 98° C. to effect removal of phenolic compounds with the ammonia, subjecting the liquor to further treatment to set free combined ammonia and driving off the ammonia set free through the free ammonia section of the still, separating phenolic compounds from the ammonia, and returning a portion of the resulting purified ammonia to the still, the amount of ammonia so returned being sufficient to insure substantially complete removal of the phenolic compounds from the liquor in the free ammonia still before the liquor is treated for the setting free of fixed ammonia.

20. The process of treating gas liquor containing phenolic impurities which comprises pre-heating the liquor, introducing the pre-heated liquor into an ammonia still and subjecting the same to distillation therein and maintaining the liquor in the upper portion of the still at a temperature of 98° C. or higher, treating the ammonia given off from the still to separate phenolic compounds therefrom, and returning a portion of the resulting purified ammonia to the still to promote the removal of phenolic compounds from the liquor.

21. The process of treating gas liquor containing phenolic impurities which comprises subjecting the same to distillation in an ammonia still, maintaining the liquor in the still at a temperature around 98 to 100° C. or higher to drive off phenolic compounds with the ammonia, passing the admixed phenolic and ammonia vapors through an absorber containing an absorbent, to remove the phenolic compounds, introducing a portion of the resulting purified ammonia into the ammonia still to provide an excess of ammonia therein to promote the removal of phenolic compounds, and recovering the phenols from the absorbent.

22. The process of treating gas liquor containing phenolic impurities which comprises subjecting the same to distillation in an ammonia still in which the liquor is maintained at a temperature in excess of about 98° C. to insure the driving off of phenolic compounds with the ammonia, purifying the resulting ammonia from phenolic compounds, subjecting the purified ammonia and admixed water vapor to a condensing or dephlegmating operation to condense a considerable portion of the water vapor together with part of the ammonia, and returning the resulting ammoniacal water to the still to increase the ammonia content thereof.

23. The process of treating gas liquor containing phenolic impurities which comprises subjecting the same to distillation in an ammonia still in which the liquor is maintained at a temperature in excess of about 98° C. to insure the driving off of phenolic compounds with the ammonia, purifying the resulting ammonia from phenolic compounds, subjecting the purified ammonia and admixed water vapor to a condensing or dephlegmating operation to condense a considerable portion of the water vapor together with part of the ammonia, and returning the resulting ammoniacal water to the still to increase the ammonia content thereof, a portion of the uncondensed purified ammonia being also returned to the still to further increase the ammonia content of the liquor therein.

24. The method of treating gas liquor containing phenolic impurities which comprises subjecting the same to distillation in an ammonia still having a free ammonia section and a fixed ammonia section, subjecting the liquor after passage through the free ammonia section to the action of reagents which will set free the fixed ammonia, maintaining the temperature of the liquor in the free ammonia section of the still in excess of about 98° C. to insure driving off of phenolic compounds with the ammonia, purifying the resulting ammonia from the accompanying phenolic compounds, subjecting the purified ammonia to a cooling or dephlegmating operation to condense a considerable portion of the admixed water vapor together with some ammonia, returning the resulting ammoniacal liquor to the fixed ammonia portion of the still, and also returning a part of the uncondensed purified ammonia gas to the free ammonia section of the still, the amount of ammonia so returned being sufficient to insure substantially complete removal of phenolic compounds with the ammonia before the liquor reaches the chemical reagents which set free the fixed ammonia.

25. The method of recovering phenols from gas liquor which comprises subjecting the gas liquor to distillation in an ammonia still in which the liquor is maintained at a temperature in excess of about 98° C. and in the presence of a sufficient excess of ammonia to insure substantially complete removal of the phenolic compounds with the ammonia, passing the resulting admixed gases through caustic alkali to combine the phenolic compounds as alkali phenolates, and setting free and recovering the phenols from the alkali phenolate.

In testimony whereof we affix our signatures.

LE ROY WILBUR HEFFNER.
WM. TIDDY.